(12) United States Patent
Murakami et al.

(10) Patent No.: US 6,292,734 B1
(45) Date of Patent: Sep. 18, 2001

(54) VEHICLE-BEHAVIOR CONTROL APPARATUS AND METHOD

(75) Inventors: Zensaku Murakami; Akira Nagae, both of Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/579,065

(22) Filed: May 26, 2000

(30) Foreign Application Priority Data

Jun. 8, 1999 (JP) .................................................. 11-160895

(51) Int. Cl.[7] .................................................. B60K 41/06
(52) U.S. Cl. .............................. 701/84; 701/82; 701/41; 477/34; 477/115; 477/107; 475/198; 475/207
(58) Field of Search .................................. 701/84, 82, 41, 701/53, 87, 51, 72; 477/34, 107, 115; 475/198, 207

(56) References Cited

U.S. PATENT DOCUMENTS

| | | | |
|---|---|---|---|
| 5,167,311 | * 12/1992 | Satoh et al. ............................ 192/73 |
| 5,353,225 | * 10/1994 | Tsuyama et al. ............... 364/426.03 |
| 5,403,247 | * 4/1995 | Yagi ..................................... 477/107 |
| 5,722,743 | * 3/1998 | Sano ..................................... 303/146 |
| 5,737,714 | * 4/1998 | Matsuno et al. ........................ 701/89 |
| 5,850,616 | * 12/1998 | Matsuno et al. ........................ 701/82 |
| 5,867,803 | * 2/1999 | Kim et al. ............................... 701/85 |
| 5,916,292 | * 6/1999 | Issa et al. ............................... 701/62 |
| 5,971,089 | * 10/1999 | Sawada ................................ 180/197 |
| 6,139,468 | * 10/2000 | Goates ................................... 477/97 |
| 6,154,702 | * 11/2000 | Fodor et al. ............................ 701/71 |

FOREIGN PATENT DOCUMENTS

A-8-310366 11/1996 (JP) .
2000343982-A * 12/2000 (JP) ................................ B60K/41/06

* cited by examiner

Primary Examiner—William A. Cuchlinski, Jr.
Assistant Examiner—Olga Hernandez
(74) Attorney, Agent, or Firm—Oliff & Berridge, PLC

(57) ABSTRACT

A vehicle-behavior control apparatus for the vehicle with a sub-transmission comprising of a control unit. This control unit is adapted to be connected to an engine system and vehicle status sensors, and directs the engine system to suppress a traction in response to spin or driftout moment determined from any outputs of the vehicle status sensors. The control unit limits the suppression of the traction when a position sensor of the sub-transmission indicates that the sub-transmission is at a lower speed range.

14 Claims, 9 Drawing Sheets

VEHICLE-BEHAVIOR CONTROL APPARATUS AND METHOD

BACKGROUND OF THE INVENTION

1. Field of the Invention

The present invention relates to a vehicle-behavior control apparatus and method for stabilizing turning behavior of a vehicle.

2. Related Background Art

There are conventionally known vehicle-behavior control systems for controlling the turning behavior of the vehicle. For example, Japanese Patent Application Laid-Open No. 8-310366 discloses such technology that, under conditions in which the vehicle is transferring into a spin tendency or into a drift-out tendency, braking force at each wheel is adjusted according to each of behavioral states so as to restrain this transfer. In carrying out the vehicle behavior control so as to restrain the spin tendency or the drift-out tendency of the vehicle in this way, it is common practice to decrease the opening angle of the throttle valve and/or decrease the engine power.

SUMMARY OF THE INVENTION

However, for example, while the vehicle is in off-road running or the like to travel on a hard uphill road, there are such circumstances that the driver implements vehicle turning behavior with intention, such as sudden steering for the purpose of selecting a road surface assumed to present a higher coefficient of friction, provision of driving slips at the wheels, and so on. If the vehicle behavior control is started under progress of such driving operation, the engine power will be lowered, so as to degrade driving performance.

The present invention has been accomplished in order to solve such a problem and an object of the invention is to provide a vehicle-behavior control apparatus and method capable of achieving driving performance reflecting driver's intention under the circumstances in which the driver implements the intentional turning behavior.

A vehicle-behavior control apparatus according to the present invention is a vehicle-behavior control apparatus for controlling behavior of the vehicle, comprising of (1) a turning behavior estimating means for estimating turning behavior of the vehicle, (2) a traction suppressing means for suppressing traction based on an estimating result of the turning behavior estimating means, (3) a sub-transmission means for converting output from a main transmission selectively into a lower speed range, and (4) a limiting means for limiting the suppressing operation of the traction suppressing means when the lower speed range is selected at the sub-transmission means.

The vehicle-behavior control apparatus according to the present invention may comprises of a control unit, adapted to be connected to an engine system and vehicle status sensors, to direct the engine system to suppress a traction in response to spin or driftout moment determined from any outputs of the vehicle status sensors and to limit the suppression of the traction when a position sensor of the sub-transmission indicates that the sub-transmission is at a lower speed range.

A vehicle-behavior control method according to the present invention is method for the vehicle with a sub-transmission comprising of (1) suppressing a traction in response to a spin or driftout moment of the vehicle, (2) limiting a suppressing operation of the traction when a lower speed range is selected at said sub-transmission.

There are some vehicles provided with the sub-transmission means in order to gain greater driving force by converting the output through the main transmission into the lower speed range. Since circumstances to run on hard uphill roads or the like are assumed in the lower speed range at the sub-transmission, the suppressing traction is limited so as to suppress decrease in the traction by suppressing output power of the driving source such as the engine or the like when the lower speed range is selected at the sub-transmission.

When the lower speed range of the sub-transmission is selected, for example, during off-road running on the hard uphill roads or the like, it is preferable to disable the suppressing traction, because it can prevent the decrease in the traction even under the circumstances in which the driver implements the intentional turning behavior.

The low vehicle speed range is normally used in many cases of off-road running. Therefore, the suppressing operation is enabled when a vehicle speed is higher than a given threshold of vehicle speed, and this threshold is shifted to a higher vehicle speed value when the lower speed range is selected at said sub-transmission. Therefore, the decrease in the traction can be prevented during running in the low vehicle speed range even under the circumstances in which the driver implements the intentional turning behavior during the off-road running.

When the lower speed range of the sub-transmission is selected, a suppressing amount of the traction is shifted to a smaller value than when not selected, whereby the decrease of the traction is suppressed even under the circumstances in which the driver implements the intentional turning behavior during the off-road running or the like, thereby permitting the driving performance reflecting the driver's intention.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 to FIG. 4 are diagrams to show the relationship among forces acting to the vehicle, wherein

DESCRIPTION OF THE PREFERRED EMBODIMENTS

Prior to the description of the embodiments, let us discuss distribution techniques for distributing the braking force to the left and right wheels and to the front and rear wheels, employed in the present embodiment.

Figure 1:
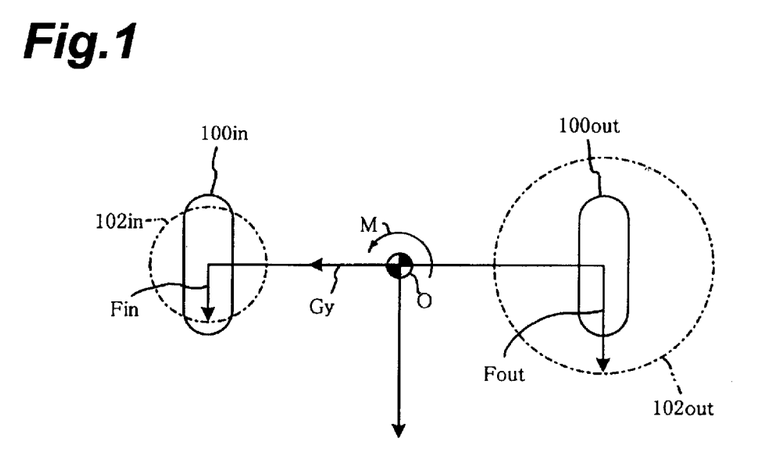
FIG. 1 is a diagram to explain a model example of a left cornering state by a vehicle model with two wheels left and right having the wheel base of 0.

First, a distribution technique to the left and right wheels will be explained. As illustrated in FIG. 1, let us assume a state in which a vehicle model with right-and-left two wheels having the wheel base of 0 is in a left turn at lateral acceleration Gy. It is noted that a friction circle 102 out of the outside wheel 100out is greater than a friction circle 102 in of the inside wheel 100in because of the load shift. Particularly, letting m be the weight of the vehicle, g be the gravity, h be the height of the gravity center O of the vehicle, and t be the tread, the radius Finmax of the friction circle of the inside wheel and the radius Foutmax of the friction circle of the outside wheel can be expressed by Eq. (1) and Eq. (2) below, respectively.

$$Finmax = m \times \frac{g}{2} - m \times Gy \times \frac{h}{t} \quad (1)$$

$$Foutmax = m \times \frac{g}{2} + m \times Gy \times \frac{h}{t} \quad (2)$$

Figure 2:
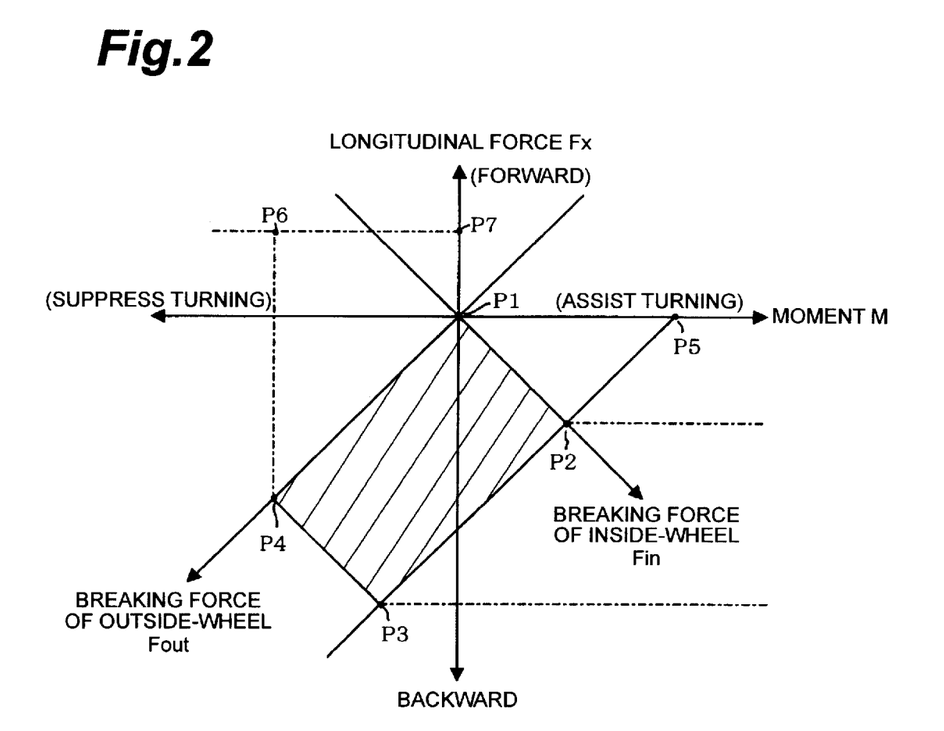
FIG. 2 shows the relationship among forces during an oversteer tendency, FIG. 3 the relationship among forces during an understeer tendency, and FIG. 4 the relationship among forces during an oversteer tendency in a vehicle at least the front wheels of which are driven.

Therefore, with the moment M on the horizontal axis and the longitudinal force Fx on the vertical axis, as illustrated in FIG. 2, the yaw moment and longitudinal force acting to the vehicle because of action of braking force fall in a hatched rectangular area (controllable range) as shown in FIG. 2. When a target yaw moment Mt and a target longitudinal force Fx are within this controllable range, two perpendiculars are drawn to each of the axis of the inside-wheel braking force and the axis of the outside-wheel braking force from a coordinate point determined by the target yaw moment Mt and the target longitudinal force Fx with reference to the axis of the yaw moment and the axis of the longitudinal force, and each of a target braking force for the inside wheel and a target braking force for the outside wheel can be obtained uniquely as a value of a coordinate point of the foot of the corresponding perpendicular.

In contrast with it, we have to define how to determine the target braking forces for the inside and the outside wheels when the target yaw moment Mt and target longitudinal force Fx are beyond the above-stated controllable range. Generally speaking, when the behavior of the vehicle is the oversteer tendency (spin tendency), it is effective to apply the antispin moment to the vehicle in order to stabilize the behavior of the vehicle. Therefore, the distribution of braking force to the left and right wheels is determined with priority to attainment of the target yaw moment Mt in the present embodiment.

Specifically, when the target yaw moment Mt and target longitudinal force Fx are present in an area defined by points P1, P4, P6, and P7 (which will be called hereinafter "spin area") as illustrated in FIG. 2, a point having coordinates of the target yaw moment and the target longitudinal force is moved in parallel to the axis of longitudinal force onto the axis of outside-wheel braking force and coordinates of a resultant point on the outside-wheel braking force axis after the movement are set as a target braking force (=0) for the inside wheel and a target braking force for the outside wheel.

When the behavior of the vehicle is the understeer tendency (drift-out tendency), it is generally effective to retard the vehicle (so as to cause a load shift, to generate a moment in a direction to assist turning, and a decrease in the vehicle speed due to the deceleration) in order to stabilize the behavior of the vehicle. Therefore, the distribution of braking force to the left and right wheels is determined with priority to attainment of the target longitudinal force in the present embodiment.

Specifically, when the target yaw moment and the target longitudinal force are within an area between a straight line parallel to the axis of moment M through the point P2 and a straight line parallel to the axis of moment M through the point P3 and below a straight line connecting the point P5 and the point P3 (this area will be referred to as "drift-out area"), a point having coordinates of the target yaw moment and the target longitudinal force is moved in parallel to the axis of moment onto a line segment P2–P3 and coordinates of a resultant point on that line segment after the movement are set as target braking forces for the inside wheel and for the outside wheel.

In the embodiment described hereinafter, when the target yaw moment Mt and the target longitudinal force Fx are calculated as values in areas other than the aforementioned controllable range, spin area, and drift-out area, the target braking forces are set as those corresponding to a point on the boundary line of the controllable range, substantially closest to coordinates of the calculated values.

For example, when the target yaw moment and the target longitudinal force are within an area below a straight line connecting the point P6 and the point P7, above the axis of outside-wheel braking force, and on the left side of the line segment P6–P4, the target braking forces for the inside wheel and for the outside wheel are set to the coordinates of the point P4. When the target yaw moment and the target longitudinal force are within an area below the axis of outside-wheel braking force, above the straight line connecting the points P5 and P3, and below a straight line connecting the point P3 and point P4, a point having coordinates of the target yaw moment and the target longitudinal force is moved in parallel to the axis of outside-wheel braking force onto the line segment P3–P4 and coordinates of a resultant point on the line segment after the movement are set as target braking forces for the inside wheel and for the outside wheel.

When the target yaw moment and the target longitudinal force are within a triangular area defined by the points P1, P2, and P5, a point having the coordinates thereof is moved in parallel to the axis of outside-wheel braking force onto the axis of inside-wheel braking force and coordinates of a resultant point on the inside-wheel braking force axis after the movement are set as a target braking force for the inside wheel and a target braking force (=0) for the outside wheel. When the target yaw moment and the target longitudinal force are within an area above the straight line parallel to the axis of moment through the point P2 and below the straight line connecting the point P5 and point P3, the coordinates of the point P2 are set as target braking forces for the inside wheel and for the outside wheel. When the target yaw moment and the target longitudinal force are within an area below the straight line parallel to the axis of moment through the point P3 and below the straight line connecting the point P5 and point P3, the coordinates of the point P3 are set as target braking forces for the inside wheel and for the outside wheel.

Figure 3:
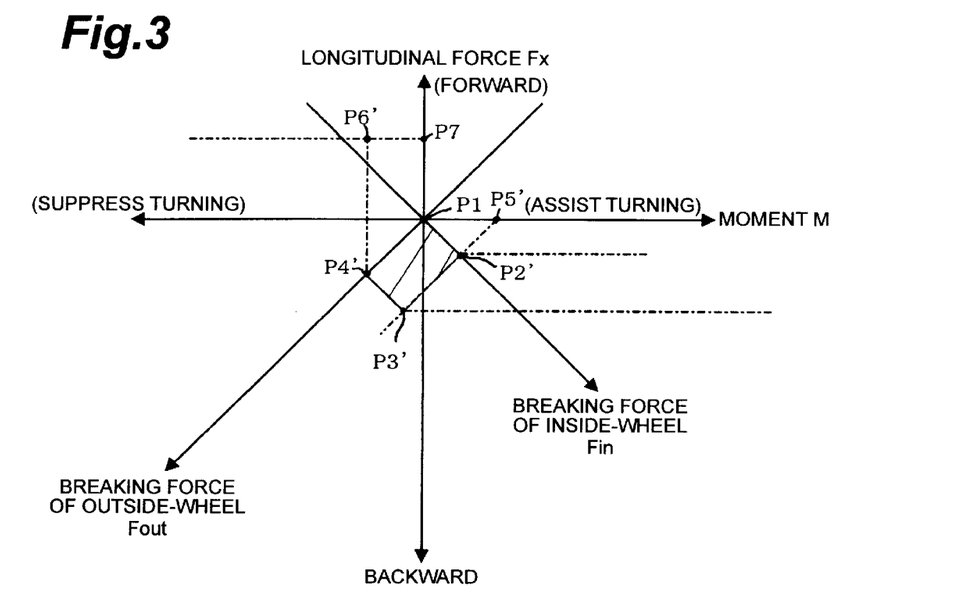

In the control of the oversteer state of the vehicle, however, an issue is decrease in lateral force due to application of braking force. Therefore, for example as illustrated in FIG. 3, the braking forces for the inside wheel and for the outside wheel are preferably set to ⅓ or less of the radius of the friction circle of the corresponding wheel. When the braking force is ⅓ or so of the radius of the friction circle, the decrease in lateral force can be controlled at 5% or so.

Figure 4:
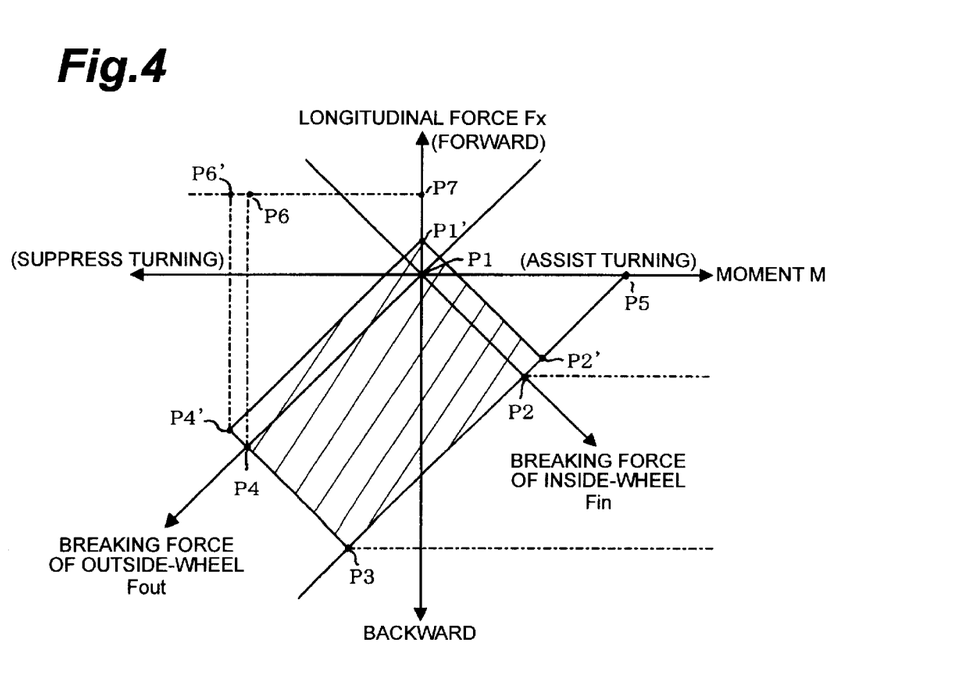

In the cases wherein the driving force is supplied to at least the front wheels, such as the four-wheel-drive vehicles, the front-wheel-drive vehicles, and the like, the yaw moment and longitudinal force that can be applied to the vehicle within the hatched area as shown in FIG. 4, and thus the controllable range is greater than that in the case of the control based on only the braking force. Only the braking force is controlled against the vehicle behavior of the understeer tendency, whereas the traction at the wheels is used additionally against the vehicle behavior of the oversteer tendency, thereby making it possible to apply a greater antispin moment to the vehicle and decrease the deceleration of the vehicle.

Figure 5:
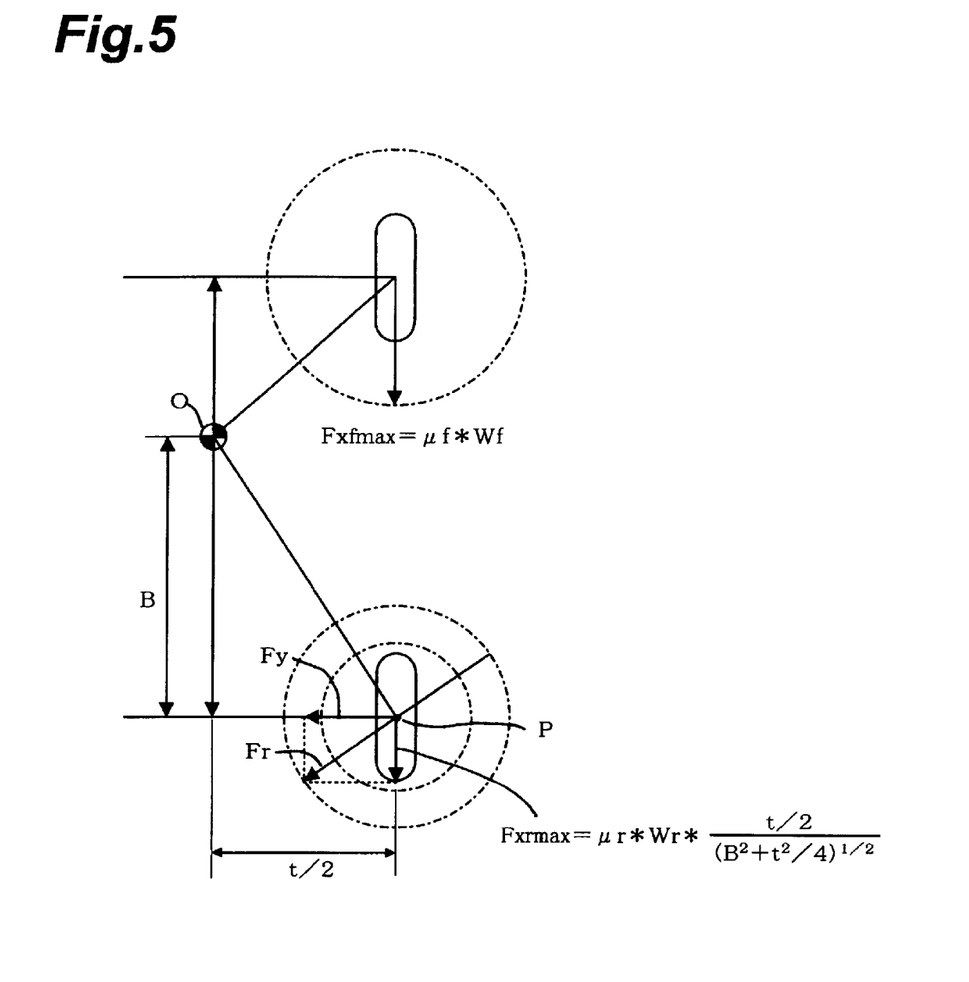
FIG. 5 is a diagram to explain how to distribute the braking force to the front and rear wheels during the oversteer tendency of the vehicle.

Next, a distribution technique of braking force to the front and rear wheels will be described. In the behavior control against the oversteer tendency, the antispin moment given to the vehicle becomes greater with increase in the braking force at the front outside wheel. The maximum longitudinal force (braking force) at the front wheel Fxfmax is given by the radius of the friction circle of the wheel, as illustrated in FIG. 5. Letting $\mu f$ be a coefficient of friction between the front wheel and the road surface and Wf be the load on the front wheel, Fxfmax can be expressed by Eq. (3) below.

$$Fxfmax = \mu f \times Wf \quad (3)$$

For applying the braking force to the rear wheel, it is necessary to determine the braking force in consideration of both a moment given by the braking force and a moment decreased by reduction of lateral force. In other words, as illustrated in FIG. 5, the maximum braking force at the rear wheel Fxrmax to be determined so that the acting direction of the resultant force Fr of the braking force Fxrmax and the lateral force Fy is normal to a straight line connecting the gravity center O of the vehicle and a road contact point P of the rear wheel on a top plan view of the vehicle and so that the magnitude of the resultant force Fr is equal to the radius of the friction circle of the rear wheel. Therefore, letting B be the distance between the gravity center O and the axis of rotation of the rear wheel, $\mu r$ be a coefficient of friction between the rear wheel and the road surface, and Wr be the load on the rear wheel, Fxrmax can be represented by Eq. (4) below.

$$Fxrmax = \mu r \times Wr \times \frac{t}{\sqrt{4 \times B^2 + t^2}} \quad (4)$$

The braking force is distributed to the front and rear wheels in accordance with a ratio of the Fxfmax and Fxrmax.

In the behavior control of the understeer tendency, the braking force is distributed proportionate to the radii of the friction circles of the front and rear wheels.

An embodiment of the present invention will be described with reference to the accompanying drawings.

Figure 6:
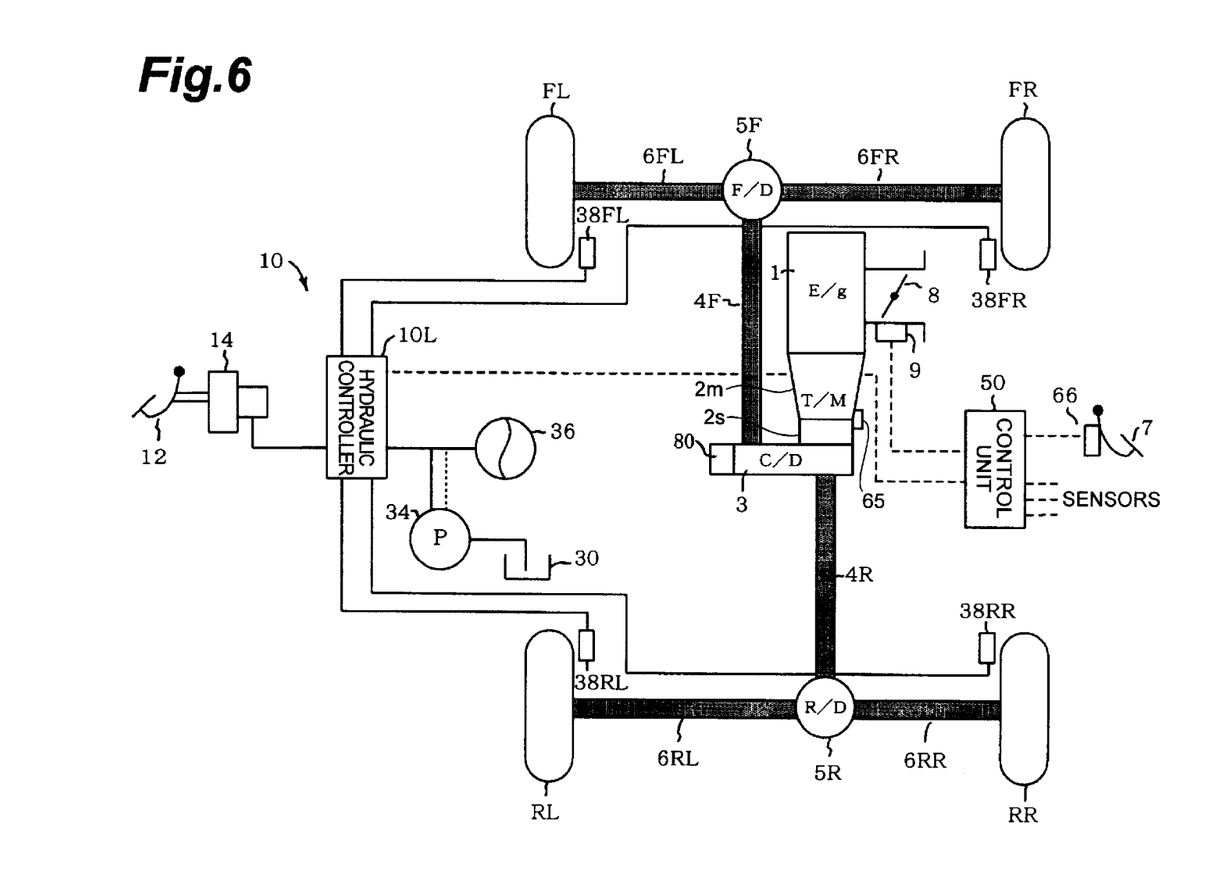
FIG. 6 is a schematic structural diagram of a vehicle-behavior control apparatus according to the present invention.

FIG. 6 schematically shows the structure of a four-wheel-drive vehicle according to the present invention. As a mechanism for conversion of rotational output from the engine 1, a sub-transmission 2s is further provided in addition to a main transmission (T/M) 2m. Therefore, the rotational output from the engine 1 is first converted at a certain ratio through the main transmission 2m and is further transferred through the sub-transmission 2s to be outputted. This sub-transmission 2s has two shift positions for a high speed range and for a low speed range. The driver selects either of the shift positions by manipulating a shift lever (not illustrated) provided for the sub-transmission 2s. The driver selects the shift position for the high speed range during normal running, but switches the shift to the shift position for the low speed range, for example, during running on especially hard uphill roads or the like (e.g., off-road running), thereby yielding a greater driving force than during the normal running.

The driving force outputted from this sub-transmission 2s is distributed through the center differential 3 to a drive shaft 4F for the front wheels and to a drive shaft 4R for the rear wheels. The front-wheel drive shaft 4F is coupled to left and right drive axles 6FL, 6FR through a front differential 5F, while the rear-wheel drive shaft 4R is coupled to left and right drive axles 6RL, 6RR through a rear differential 5R. Thus the driving force from the engine 1 is distributed through the differentials to each of the wheels FL, FR, RL, RR.

The braking force at each wheel FL, FR, RL, or RR is controlled by adjusting braking pressure at each wheel cylinder 38FL, 38FR, 38RL, or 38RR by a hydraulic controller 10L of the braking system 10.

Figure 7:
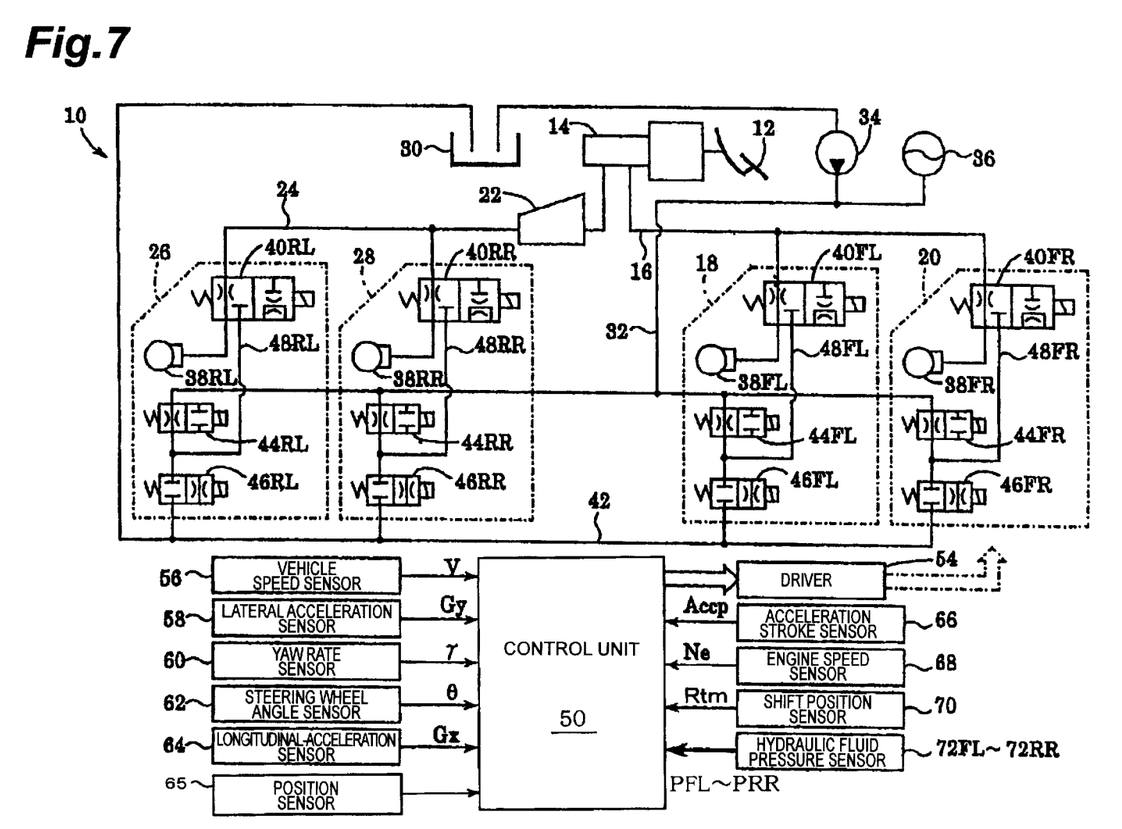
FIG. 7 is a schematic structural diagram of a braking system of the vehicle.

FIG. 7 shows the structure of the braking system 10. The braking system 10 has a master cylinder 14 for delivering the brake oil through first and second ports in response to driver's brake-pedal actuation, and the first port is connected to brake pressure control unit 50s 18 and 20 for the front left and right wheels by a brake pressure control tube 16 for the front wheels. The second port is connected to brake pressure control unit 50s 26 and 28 for the rear left and right wheels by a brake pressure control tube 24 for the rear wheels equipped with a proportional valve 22 midway. The braking system 10 also has an oil pump 34 to pump up the brake oil reserved in a reservoir 30 and supply the high-pressure oil through a high-pressure tube 32. The high-pressure tube 32 is connected to each of the brake pressure control units 18, 20, 26, 28 and an accumulator 36 is connected to a midpoint of the tube.

Each brake pressure control unit 18, 20, 26, or 28 has a wheel cylinder 38FL, 38FR, 38RL, or 38RR for controlling the braking force at a corresponding wheel, a solenoid-operated control valve 40FL, 40FR, 40RL, or 40RR of a 3-port 2-position switching type, a normally opened, solenoid-operated open/close valve 44FL, 44FR, 44RL, or 44RR provided between a low-pressure tube 42 connected to the reservoir 30, and the high-pressure tube 32, and a normally closed, solenoid-operated open/close valve 46FL, 46FR, 46RL, or 46RR. The high-pressure tube 32 between the valve 44FL, 44FR, 44RL, 44RR and the valve 46FL, 46FR, 46RL, 46RR in each unit is connected to the control valve 40FL, 40FR, 4ORL, or 40RR by a connection tube 48FL, 48FR, 48RL, or 48RR.

Each control valve 40FL or 40FR is arranged to switch between a first position in the figure to establish communication between the brake pressure control tube 16 for the front wheels and the wheel cylinder 38FL or 38FR and cut off communication between the wheel cylinder 38FL or 38FR and the connection tube 48FL or 48FR and a second position to cut off the communication between the brake pressure control tube 16 and the wheel cylinder 38FL or 38FR and establish the communication between the wheel cylinder 38FL or 38FR and the connection tube 48FL or 48FR. Similarly, each control valve 40RL or 40RR is arranged to switch between a first position in the figure to establish communication between the brake pressure control tube 24 for the rear wheels and the wheel cylinder 38RL or 38RR and cut off communication between the wheel cylinder 38RL or 38RR and the connection tube 48RL or 48RR and a second position to cut off the communication between the brake pressure control tube 24 and the wheel cylinder 38RL or 38RR and establish the communication between the wheel cylinder 38RL or 38RR and the connection tube 48RL or 48RR.

When the open/close valve 44FL, 44FR, 44RL, 44RR and the open/close valve 46FL, 46FR, 46RL, 46RR are controlled in the illustrated state with the control valve 40FL, 40FR, 40RL, 40RR at the second position, the wheel cylinder 38FL, 38FR, 38RL, 38RR is in communication with the high-pressure tube 32 through the control valve 40FL, 40FR, 40RL, 40RR and the connection tube 48FL, 48FR, 48RL, 48RR, thereby increasing the pressure inside the wheel cylinder 38FL, 38FR, 38RL, 38RR. Conversely, when the open/close valve 44FL, 44FR, 44RL, 44RR is closed and the open/close valve 46FL, 46FR, 46RL, 46RR is opened with the control valve 40FL, 40FR, 40RL, 40RR at the second position, the wheel cylinder 38FL, 38FR, 38RL, 38RR is in communication with the low-pressure tube 42 through the control valve 40FL, 40FR, 40RL, 40RR and the connection tube 48FL, 48FR, 48RL, 48RR, thereby decreasing the pressure inside the wheel cylinder 38FL, 38FR, 38RL, 38RR. When the open/close valve 44FL, 44FR, 44RL, 44RR and the open/close valve 46FL, 46FR, 46RL, 46RR both are closed with the control valve 40FL, 40FR, 40RL, 40RR at the second position, the wheel cylinder 38FL, 38FR, 38RL, 38RR is interrupted from both the high-pressure tube 32 and the low-pressure tube 42, thereby maintaining the pressure inside the wheel cylinder 38FL, 38FR, 38RL, 38RR as it is.

As constructed in the above structure, the braking system 10 is able to generate the braking force according to the stroke of the brake pedal 12 actuated by the driver by means of the wheel cylinders 38FL, 38FR, 38RL, 38RR when the control valves 40FL, 40FR, 40RL, 40RR are at their first position, and to control the braking force at either one of the wheels, regardless of the stroke of the brake pedal 12 and the braking force at the other wheels, by the open/close control of the open/close valve 44FL, 44FR, 44RL, 44RR and the open/close valve 46FL, 46FR, 46RL, 46RR of the associated wheel when either of the control valves 40FL, 40FR, 40RL, 40RR is at its second position.

As constructed in the above structure, the braking system 10 is able to generate the braking force according to the stroke of the brake pedal 12 actuated by the driver by means of the wheel cylinders 38FL, 38FR, 38RL, 38RR when the control valves 40FL, 40FR, 40RL, 40RR are at their first position, and to control the braking force at either one of the wheels, regardless of the stroke of the brake pedal 12 and the braking force at the other wheels, by the open/close control of the open/close valve 44FL, 44FR, 44RL, 44RR and the open/close valve 46FL, 46FR, 46RL, 46RR of the associated wheel when either of the control valves 40FL, 40FR, 40RL, 40RR is at its second position.

On the other hand, a control unit 50 receives detection results from a vehicle speed sensor 56 for detecting the vehicle speed V, a lateral acceleration sensor 58 for detecting the lateral acceleration Gy acting to the body, a yaw rate sensor 60 for detecting the yaw rate $\gamma$ acting to the body, a steering wheel angle sensor 62 for detecting the steering wheel angle $\theta$, a longitudinal acceleration sensor 64 for detecting the longitudinal acceleration Gx acting to the body, a shift position sensor 65 for detecting the shift position of the sub-transmission 2s, an accelerator stroke sensor 66 for detecting the stroke Accp of the accelerator pedal 7, an engine speed sensor 68 for detecting the engine speed Ne, a shift position sensor 70 for detecting the shift position Rtm of the main transmission 2m, and hydraulic fluid pressure sensors (pressure sensors) 72FL, 72FR, 72RL, 72RR for detecting the oil pressure (brake pressure) inside the wheel cylinders 38FL, 38FR, 38RL, 38RR. The control unit 50 carries out control operations including control of the operation of the braking system 10, control of driving of a throttle motor 9 for changing the travel of a throttle valve 8, control of power output of the engine 1, etc., based on these detection results. The lateral acceleration sensor 58 and other sensors are arranged to detect the lateral acceleration and other factors the positive direction of which is defined along the left turning direction of the vehicle.

Figure 8:
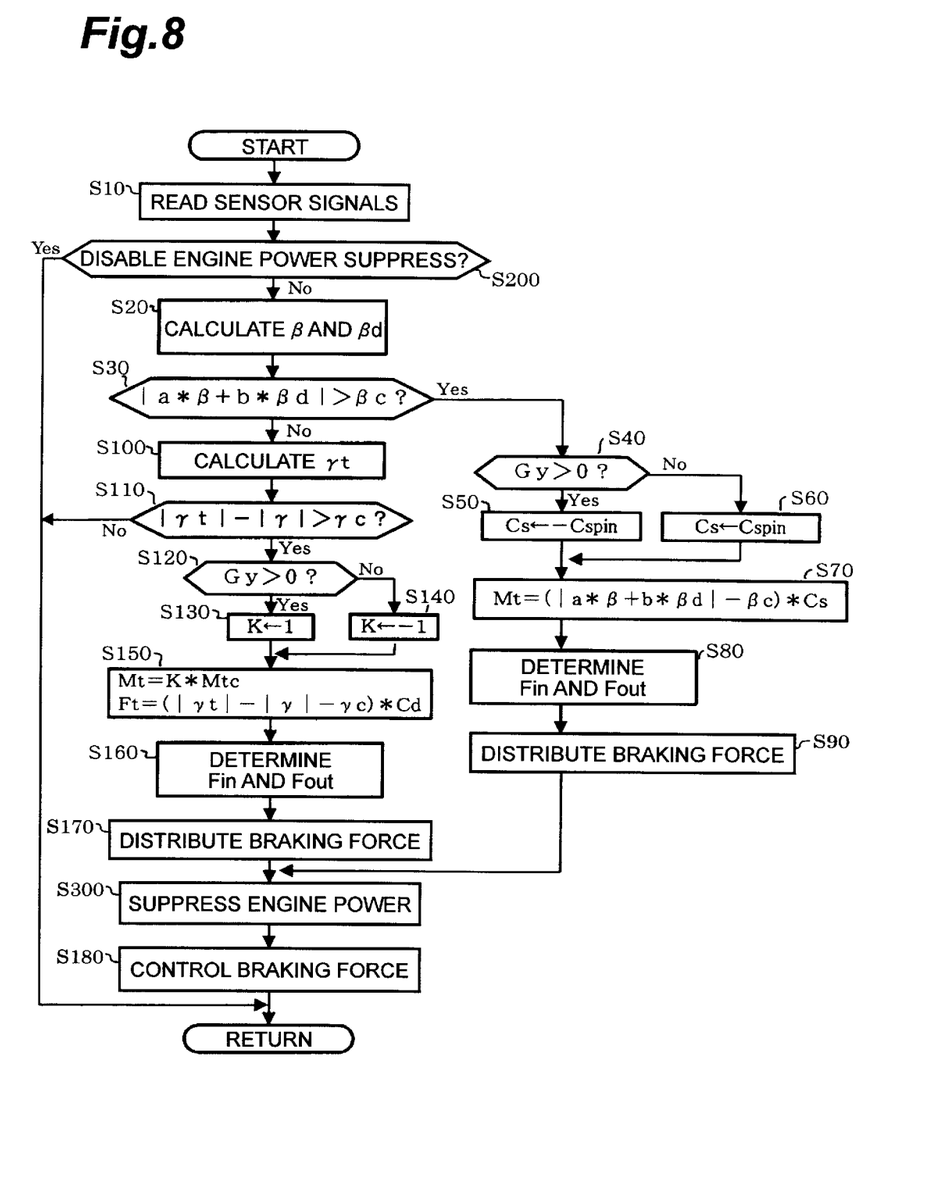
FIG. 8 is a flowchart of control operation of the apparatus of FIG. 6.

Now, the turning behavior control of the vehicle carried out by the control unit 50 will be explained along the flowchart of FIG. 8. The flowchart illustrated in FIG. 8 is started with on of the ignition switch and is carried out repeatedly at predetermined time intervals.

First, the control unit 50 reads sensor signals which represent the detection results of the various sensors including the vehicle speed sensor 56 etc. in step (which will be represented by "S") 10.

In next S200, if the aforementioned sub-transmission 2s is at the shift position for the low speed range then a limit process for limiting the decrease of the engine power is carried out by limiting a suppressing process of engine power (S300) described below. This limit process will be detailed below.

In next S20, the control unit 50 calculates deviation of lateral acceleration (side slip acceleration of the vehicle) Vyd as a difference, Gy−V×$\gamma$, between the product V×$\gamma$ of the vehicle speed V and the yaw rate $\gamma$, and the lateral acceleration Gy, calculates side slip velocity Vy of the vehicle by integrating the deviation Vyd of lateral acceleration, and calculates a slip angle $\beta$ of the vehicle as a ratio Vy/Vx of the side slip velocity Vy of the vehicle to the longitudinal velocity Vx (=vehicle speed V) of the vehicle. The control unit 50 also calculates body slip angular velocity $\beta$d as a differential of the slip angle $\beta$ of the body.

In next S30, the control unit 50 evaluates whether an absolute value of a linear combination a×$\beta$+b×$\beta$d of the body slip angle $\beta$ and slip angular velocity $\beta$d, where a and b are positive constants, is over a reference value $\beta$c (a positive constant), i.e., whether the vehicle is going into the spin tendency.

If the control unit evaluates "Yes" in S30, i.e., when the vehicle is judged as going into the spin tendency, then the control unit 50 advances to S40 to evaluate whether the lateral acceleration Gy is positive, i.e., whether the vehicle is in the turning left state. When the vehicle is in the turning left state, the control unit 50 goes to S50 to set a coefficient Cs in Eq. (5) below to −Cspin, where Cspin is a positive constant. When the vehicle is in the turning right state, the control unit 50 goes to S60 to set the coefficient Cs to Cspin.

In next S70, the control unit 50 calculates the target yaw moment Mt according to Eq. (5) below and sets the target longitudinal force Ft to Ftc (constant).

$$Mt=(|a\times\beta+b\times\beta d|-\beta c)\times Cs \quad (5)$$

In next S80, the control unit calculates the radii Finmax and Foutmax of the friction circles of the inside and outside wheels according to Eq. (1) and Eq. (2) stated previously, thereby determining the points P2 to P5 of the map illustrated in FIG. 4. The control unit 50 also calculates the output torque Te of the engine 1 from a predetermined map preliminarily prepared, based on the stroke Accp of the accelerator pedal 7 and the engine speed Ne. Then the control unit 50 calculates tractions Fdin and Fdout at the inside and outside wheels from a predetermined map, based on a transmission ratio derived from the shift position of the main transmission 2m and the shift position of the sub-transmission 2s, and the output torque Te. These calculations yield the points P1', P4', and P6'. The braking force Fout for the outside wheels is determined by the aforementioned technique, based on the map of FIG. 4 determined in this way.

Figure 9:
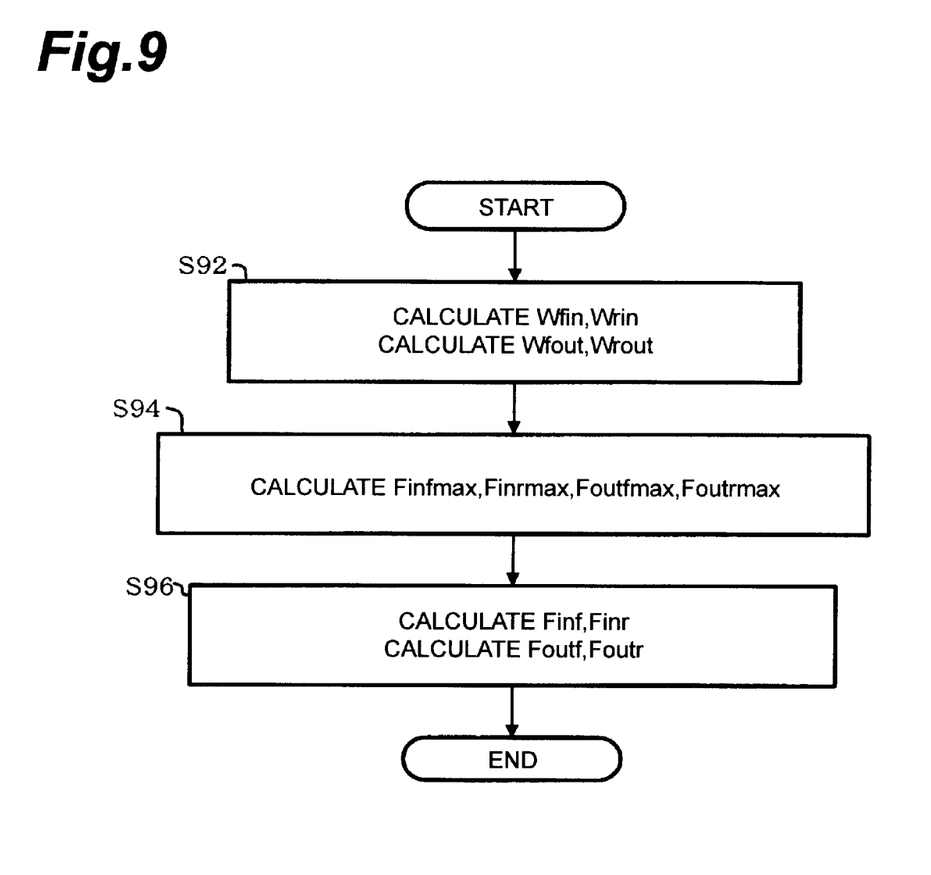
FIG. 9 to FIG. 12 are flowcharts to show part or modified part of the flowchart of FIG. 8.

In next S90, the braking force Fout for the outside wheels is distributed to the front and rear wheels in accordance with the flowchart illustrated in FIG. 9, thereby computing the target braking forces at the front and rear outside wheels.

In S92, the control unit 50 first calculates the load Wfin and Wrin acting on the front and rear inside 10 wheels, respectively, according to Eq. (6) and Eq. (7) below based on the longitudinal acceleration Gx and the lateral acceleration Gy, where mf and mr are a mass on the front or rear wheel side of the vehicle and Cfr is a rate of roll stiffness distribution of the front wheels. The control unit 50 also calculates the load Wfout and Wrout acting on the front and rear outside wheels, respectively, according to Eq. (8) and Eq. (9) below based on the longitudinal acceleration Gx and the lateral acceleration Gy.

$$Wfin = mf \times \frac{g}{2} - m \times Gx \times h - Cfr \times m \times Gy \times \frac{h}{t} \quad (6)$$

$$Wrin = mr \times \frac{g}{2} + m \times Gx \times h - (1 - Cfr) \times m \times Gy \times \frac{h}{t} \quad (7)$$

$$Wfout = mf \times \frac{g}{2} - m \times Gx \times h + Cfr \times m \times Gy \times \frac{h}{t} \quad (8)$$

$$Wrout = mr \times \frac{g}{2} + m \times Gx \times h + (1 - Cfr) \times m \times Gy \times \frac{h}{t} \quad (9)$$

In next S94, the maximum braking forces Finfmax and Finrmax those can be produced at the front and rear inside wheel, respectively, are calculated according to Eq. (10) and Eq. (11) corresponding to aforementioned Eq. (3) and Eq. (4), where $\mu$inf and $\mu$inr are coefficients of friction at the front and rear inside wheels, respectively, against the road surface. The control unit 50 also calculates the maximum braking forces Foutfmax and Foutrmax those can be produced at the front and rear outside wheels, respectively, according to Eq. (12) and Eq. (13) corresponding to aforementioned Eq. (3) and Eq. (4), where $\mu$outf and $\mu$outr are coefficients of friction at the front and rear outside wheels, respectively, against the road surface.

$$Finfmax = \mu inf \times Wfin \quad (10)$$

$$Finrmax = \mu inr \times Wrin \quad (11)$$

$$Foutfmax = \mu outf \times Wfout \quad (12)$$

$$Foutrmax = \mu outr \times Wrout \times \frac{t}{\sqrt{4 \times B^2 + t^2}} \quad (13)$$

In next S96, the braking force Fin for the inside wheels is distributed proportionate to the maximum braking forces Finfmax and Finrmax according to Eq. (14) and Eq. (15) below, thereby calculating the target braking forces Finf and Finr for the front and rear inside wheels. The braking force Fout for the outside wheels is also distributed proportionate to the maximums braking forces Foutfmax and Foutrmax according to Eq. (16) and Eq. (17) below, thereby calculating the target braking forces Foutf and Foutr for the front and rear outside wheels. Then the process indicated by S90 is terminated.

$$Finf = Fin \times \frac{Finfmax}{(Finfmax + Finrmax)} \quad (14)$$

$$Finr = Fin \times \frac{Finrmax}{(Finfmax + Finrmax)} \quad (15)$$

$$Foutf = Fout \times \frac{Foutfmax}{(Foutfmax + Foutrmax)} \quad (16)$$

$$Foutf = Fout \times \frac{Foutrmax}{(Foutfmax + Foutrmax)} \quad (17)$$

Returning to the flowchart of FIG. 8, if the control unit 50 evaluates "No" in S30, i.e., when it is not evaluated that the vehicle is in the spin tendency, then the control unit 50 goes to S100 to calculate a reference yaw rate $\gamma$c according to Eq. (18) below, where Kh is a stability factor and L is the wheel base. The control unit 50 also calculates a target yaw rate yt according to Eq. (19) below, where T is a time constant and s is the Laplacian.

$$\gamma c = V \times \theta \times (1 + Kh \times V^2) \times L \quad (18)$$

$$\gamma t = \frac{\gamma c}{1 + T \times s} \quad (19)$$

In next S110, the control unit 50 evaluates whether a difference, $|\gamma t| - |\gamma|$, between an absolute value of the target yaw rate $\gamma$t and an absolute value of an actual yaw rate $\gamma$ of the vehicle is over the reference value $\gamma$c (positive constant), i.e., whether the vehicle is going into the drift-out tendency.

If the control unit 50 evaluates "Yes" in S110, i.e., when the vehicle is judged as going into the drift-out tendency, the control unit 50 goes to S120 to evaluate whether the lateral acceleration Gy is positive, i.e., whether the vehicle is in the turning left state. If the control unit 50 evaluates "Yes" in S120, the control unit 50 goes to S130 to set the value of coefficient K to 1. If the control unit 50 evaluates "No" in S120, the control unit 50 advances to S140 to set the value of coefficient K to -1.

The control unit 50 advances via S130 or S140 to S150 to set a target yaw moment Mt to K×Mtc where Mtc is a constant, and also calculates a target longitudinal force Ft according to Eq. (20) below.

$$Ft = (|\gamma t| - |\gamma| - \gamma c) \times Cd \quad (20)$$

In next S160, the control unit 50 calculates the radii Finmax and Foutmax of the friction circles of the inside and outside wheels according to aforementioned Eq. (1) and Eq. (2), determines the points P2' to P6' in the map of FIG. 3, based on the values of ⅓ of these radii of the friction circles, and determines the braking forces Fin and Fout for the inside and outside wheels by the aforementioned technique, based on the map of FIG. 3 determined in this way.

In next S170, the control unit 50 distributes the braking force Fin for the inside wheels and the braking force Fout for the outside wheels to the front and rear wheels in much the same fashion as in S90, thereby calculating the target braking forces at the respective wheels. The maximum braking force Finrmax that can be produced at the rear inside wheel is calculated according to Eq. (21) below substituting for Eq. (13) in S94 in the flowchart of FIG. 9.

$$\text{Finrmax} = \mu_{inr} \times W_{rin} \tag{21}$$

In next S300, the control unit 50 suppresses the engine power. Specifically, the control unit 50 automatically decreases the opening angle of the throttle valve 8 in accordance with a vehicle state amount captured, for example, in S30 or in S110. Normally, the opening angle of the throttle valve 8 is determined according to the stroke Accp of the accelerator pedal 7 detected by the accelerator stroke sensor 66, whereas during execution of the behavior control to stabilize the turning behavior by the braking system 10 as described above, a throttle motor 9 is actuated irrespective of the stroke Accp of the accelerator pedal 7 under control of the control unit 50, thereby displacing the throttle valve 8 down to a predetermined opening angle closer to the closed end.

A map is preliminarily made to define throttle-valve opening angles according to various vehicle state amounts including the spin tendency, the drift-out tendency, etc., and a throttle-valve opening angle is determined in S300 by searching the map, based on the vehicle state amount captured. The throttle motor 9 is then actuated according to the throttle-valve opening angle thus determined.

In next S180, the control unit 50 calculates a target brake pressure of the wheel cylinder 38i (i=FL, FR, RL, RR) of each wheel, based on the target braking force at each wheel calculated in S90 or in S170, and also calculates a duty ratio Dir according to Eq. (22) below. In Eq. (22) below, Kp and Kd are gain coefficients of the proportional and differential in the feedback control of the control pressure, Pi is the pressure in the wheel cylinder at each wheel, and Pti is the target wheel-cylinder pressure at each wheel.

$$Dir = Kp \times (Pi - Pti) + Kd \times \frac{d(Pi - Pti)}{dt} \tag{22}$$

In S180 a control signal is outputted from the control unit 50 to the control valve 40i of the wheel the braking pressure of which is to be increased or decreased, whereby the control valve is switched to the second position in response thereto. A control signal corresponding to the duty ratio Dir is also outputted to the open/close valves of the outside wheel of that wheel, thereby controlling the supply/stop of the accumulator pressure to the wheel cylinder 38i. This increases or decreases the braking pressure, thereby controlling the braking force to the target braking force at each wheel.

In this case, when the duty ratio Dir is a value between a negative reference value and a positive reference value, the upstream open/close valve is switched to the second position and the downstream open/close valve is held at the first position, thereby maintaining the pressure in the corresponding wheel cylinder. When the duty ratio Dir is not less than the positive reference value, the upstream and downstream open/close valves of the outside wheel are controlled to the positions illustrated in FIG. 7, to supply the accumulator pressure to the corresponding wheel cylinder, thereby increasing the pressure in this wheel cylinder. When the duty ratio Dir is not more than the negative reference value, the upstream and downstream open/close valves of the outside wheel are switched to the second position, to discharge the brake oil in the corresponding wheel cylinder to through the low-pressure tube 42, thereby decreasing the pressure in this wheel cylinder.

Now the detail of the limit process indicated previously as S200, i.e., the limit process to limit the suppressing process of engine output (S300), thereby suppressing the decrease of engine power will be described.

Figure 10:
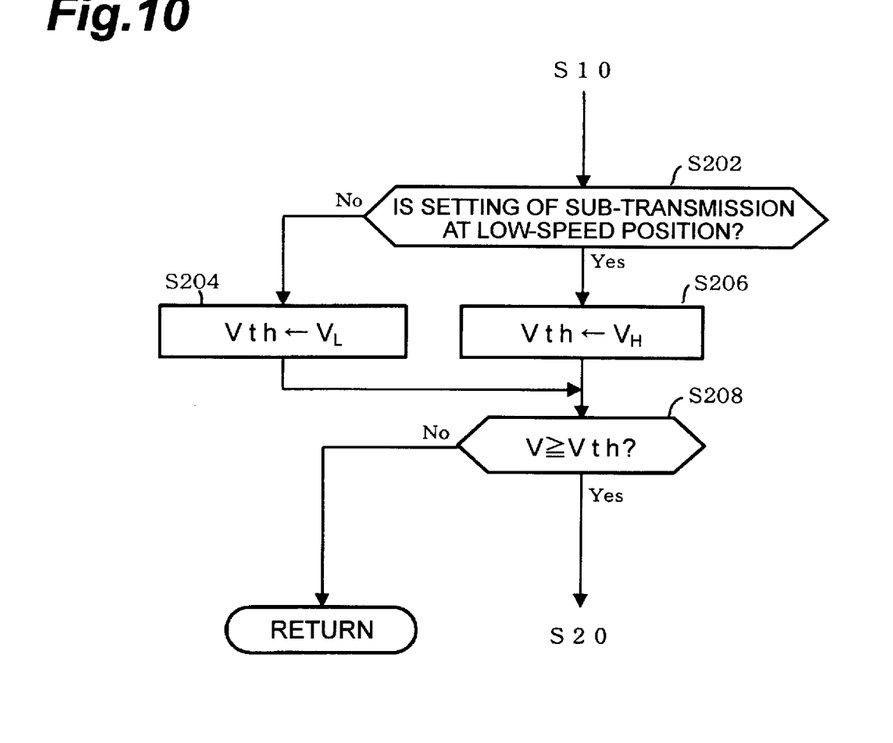

An example of this limit process is shown in the flowchart illustrated in FIG. 10. First, in S202 the control unit 50 evaluates whether the sub-transmission 2s is at the shift position for the low speed range, by detecting the position of the shift lever for the sub-transmission 2s, based on the result of detection of the position sensor 65.

When the sub-transmission 2s is at the shift position for the high speed range ("No" in S202), the control unit goes to S204 to set the threshold Vth of the vehicle speed V, as one of execution conditions for the turning behavior control as described previously, to $V_L$ (for example, 15 km/h). When the sub-transmission 2s is at the shift position for the low speed range ("Yes" in S202), the control unit goes to S206 to set the threshold Vth of the vehicle speed V to $V_H$ (for example, 30 km/h). In this way, the threshold of the vehicle speed V as an execution enabling condition for the turning behavior control is set to the higher speed value with the sub-transmission 2s at the low-speed shift position than at the high-speed shift position, through the process of S204 or S206.

After S204 or S206, the control unit 50 goes to S208 to compare the present vehicle speed V with the threshold Vth. When the result shows that the vehicle speed V is not less than the threshold Vth, the control unit 50 goes to S20 and the processes thereafter to execute the steps described previously. When the vehicle speed V is lower than the threshold Vth, all following processes are skipped and this routine is terminated immediately, because the execution condition for the turning behavior control is not met. In this case, therefore, the aforementioned turning behavior control is not carried out, but the normal braking control is carried out according to the stroke of the brake pedal 12.

As described above, the threshold Vth is shifted to the higher speed value with the sub-transmission 2s at the low shift position than at the high shift position. This limits the start of the suppressing process of engine output power (S300) in the low speed range, whereby the decrease of engine power against driver's will can be prevented under the circumstances in which the driver implements the intentional turning behavior during the off-road running or during running on hard uphill roads or the like by use of the low speed range.

Figure 11:
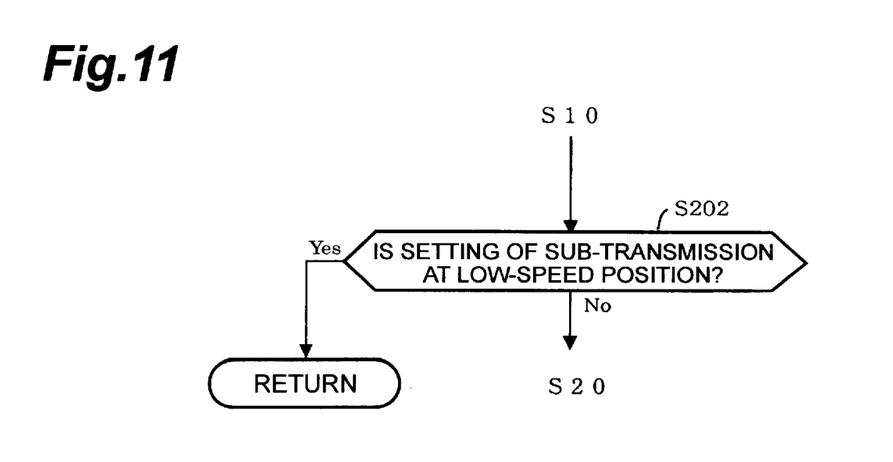

As another embodiment, as illustrated in FIG. 11, the control unit may also be arranged to evaluate whether the sub-transmission 2s is at the low shift position, similarly in S202, to terminate this routine immediately with the sub-transmission at the low shift position as a result of the evaluation, and to proceed to the processes of S20 and the steps thereafter with the sub-transmission at the high shift position. In this operation, the turning behavior control executed in S20 and the steps thereafter is disabled when the sub-transmission 2s is at the low shift position. In this case, therefore, the apparatus can also prevent the event of automatically decreasing the engine output power against the driver's will under the circumstances in which the sub-transmission 2s is at the low shift position.

The limit process for limiting the decrease of engine output power as described above can also be carried out in S300, as well as S200. An example of this processing is presented in the flowchart of FIG. 12.

Figure 12:
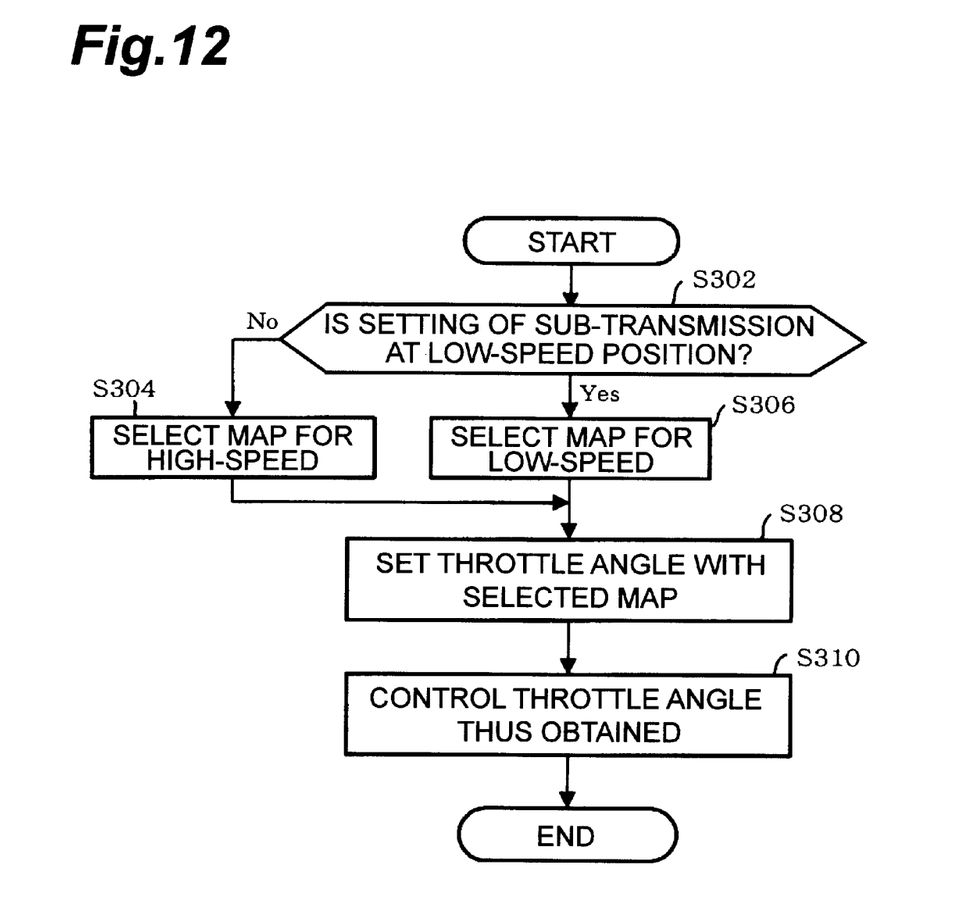

First, S302 is a step of evaluating whether the shift position of the sub-transmission 2s is the low shift position, as in S202 described above. When the result shows that the shift position is the high shift position (evaluated "No" in S302), the control unit 50 goes to S304 to select a map for high speed. When the shift position is the low shift position (evaluated "Yes" in S302), the control unit 50 goes to S306 to select a map for low speed. These maps are maps to define opening angles of the throttle valve 8 according to vehicle state amounts captured, for example, in S30 or in S110, and the low-speed map is set to include greater opening angles of the throttle valve 8 than the high-speed map in accordance with identical vehicle state amounts. Namely, when the sub-transmission 2s is at the low shift position, the low-speed map is set so as to generate larger driving force by decreasing the suppressing amount of engine power.

In next S308, the control unit 50 determines an opening angle of the throttle valve 8 according to the vehicle state amount, based on the map selected in S304 or in S306, and in next S310 the throttle motor 9 is actuated according to the opening angle of the throttle valve 8 determined in S308.

By switching between the low-speed map and the high-speed map, the decrease of the engine output power is suppressed upon selection of the low-speed map, when compared with that upon selection of the high-speed map, whereby the decrease of the engine output power can be more suppressed when the driver selects the low shift position of the sub-transmission 2s than when selecting the high shift position.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A vehicle-behavior control apparatus comprising of:
   a turning behavior estimating means for estimating turning behavior of the vehicle;
   a traction suppressing means for suppressing traction based on an estimating result of said turning behavior estimating means;
   a sub-transmission means for converting output from a main transmission selectively into a lower speed range; and
   a limiting means for limiting the suppressing operation of said traction suppressing means when the lower speed range is selected at said sub-transmission means.

2. The vehicle-behavior control apparatus according to claim 1, wherein said limiting means disables the suppressing operation of said traction suppressing means when the lower speed range is selected at said sub-transmission means.

3. The vehicle-behavior control apparatus according to claim 1, wherein said limiting means shifts a threshold of vehicle speed for starting the suppressing operation of said traction suppressing means to a higher vehicle speed value when the lower speed range is selected at said sub-transmission means.

4. The vehicle-behavior control apparatus according to claim 1, wherein said limiting means shifts a suppressing amount of the traction to be suppressed by said traction suppressing means to a smaller value when the lower speed range is selected at said sub-transmission means.

5. A vehicle-behavior control apparatus for the vehicle with a sub-transmission comprising of:
   a control unit, adapted to be connected to an engine system and vehicle status sensors, to direct the engine system to suppress a traction in response to spin or driftout moment determined from any outputs of the vehicle status sensors and to limit the suppression of the traction when a position sensor of the sub-transmission indicates that the sub-transmission is at a lower speed range.

6. The vehicle-behavior control apparatus according to claim 5, wherein said control unit only direct the engine system to suppress the traction when the position sensor of the sub-transmission indicates that the sub-transmission is not at the lower speed range.

7. The vehicle-behavior control apparatus according to claim 5, wherein said control unit direct the engine system to suppress the traction when a vehicle speed sensor indicates that the vehicle speed is higher than a given threshold of the vehicle speed, and said threshold shifts to a higher vehicle speed value when the position sensor of the sub-transmission indicates that the sub-transmission is not at the lower speed range.

8. The vehicle-behavior control apparatus according to claim 5, wherein said control unit shifts the suppressing amount of the traction by the engine system to a smaller value when the position sensor of the sub-transmission indicates that the sub-transmission is not at the lower speed range.

9. The vehicle-behavior control apparatus according to claim 5, wherein said control unit direct the engine system to suppress the traction by controlling a throttle valve.

10. The vehicle-behavior control method for the vehicle with a sub-transmission comprising of:
    suppressing a traction in response to a spin or driftout moment of the vehicle,
    limiting a suppressing operation of the traction when a lower speed range is selected at said sub-transmission.

11. The vehicle-behavior control method according to claim 10, wherein said suppressing operation is disabled when the lower speed range is selected at said sub-transmission.

12. The vehicle-behavior control method according to claim 10, wherein said suppressing operation is enabled when a vehicle speed is higher than a given threshold of vehicle speed, and said threshold is shifted to a higher vehicle speed value when the lower speed range is selected at said sub-transmission.

13. The vehicle-behavior control method according to claim 10, wherein the suppressing amount of the traction is shifted to a smaller value when the lower speed range is selected at said sub-transmission.

14. The vehicle-behavior control method according to claim 10, wherein said suppressing operation is suppressing the output power of an engine.

* * * * *